April 8, 1958     H. B. DRAPEAU ET AL     2,829,834
POPPET TYPE THERMOSTAT VALVE
Filed April 19, 1956     2 Sheets-Sheet 1

INVENTORS
HAROLD B. DRAPEAU
BY GEORGE J. SAFRANEK
ATTORNEYS

April 8, 1958  H. B. DRAPEAU ET AL  2,829,834
POPPET TYPE THERMOSTAT VALVE

Filed April 19, 1956  2 Sheets-Sheet 2

INVENTORS
HAROLD B. DRAPEAU
BY GEORGE J. SAFRANEK

ATTORNEYS

United States Patent Office 2,829,834
Patented Apr. 8, 1958

2,829,834
POPPET TYPE THERMOSTAT VALVE

Harold B. Drapeau, Oak Park, and George J. Safranek, Chicago, Ill., assignors to The Dole Valve Company, Chicago, Ill., a corporation of Illinois Application April 19, 1956, Serial No. 579,279

7 Claims. (Cl. 236—34)

This invention relates in general to a temperature responsive valve for controlling fluid flow, and more particularly to a poppet type thermostat valve for controlling the flow of cooling liquid in an internal combustion engine, although other uses and purposes will be apparent to one skilled in the art.

Heretofore, temperature responsive valves for controlling the flow of cooling liquid in a passage included an assembly of several brackets, some of which were spun or riveted together, this obviously requiring the use of special assembling tools. Where some brackets were secured in attachment holes, leakage could occur, which obviously would reduce the overall efficiency of the valve. Moreover, in prior valves, entrapment of dirt or other foreign particles would prevent complete closing of the valve, thereby allowing leakage which was undesirable.

In the present invention, a temperature responsive fluid control poppet type valve is provided which includes a valve body with flow passages and a guide aperture therethrough, and a single bracket extending from the discharge side of the valve which may be easily snapped into slots in the valve body by hand. A thermal actuator having a valve member press-fitted to the body of the element and coacting with the inlet side of the valve to selectively cover the flow passages in the valve body, is slidably guided in the valve body guide aperture so that the movable piston in the element abuts against the bracket extending from the discharge side of the valve. Spring means is provided to bias the valve member into closed position with the valve body at all times.

Accordingly, it is an object of this invention to provide an improved fluid control valve having a minimum of parts and being of simple and economical manufacture.

Another object of this invention is to provide a fluid control valve which, for the most part, can be assembled by hand, and wherein no spinning or riveting assembly operation is necessary.

A further object of this invention is to provide a fluid control valve including a valve body having a bracket attached thereto in such a manner that leakage cannot occur through the bracket attachment holes.

A still further object of this invention is the provision of a fluid control valve, wherein the valve member can tilt with respect to the valve body thereby accounting for less leakage in case of dirt entrapment.

A further object of this invention is to provide a fluid control valve wherein the valve member will tilt upon initially opening to improve metering and thereby result in better temperature control.

A still further object of this invention is to provide a temperature responsive fluid control valve, wherein the opening action of the valve is less abrupt and therefore reduces fluttering of the valve.

Other objects, features and advantages of the invention will be apparent from the following detailed disclosure, taken in conjunction with the accompanying sheets of drawings, wherein like reference numerals refer to like parts, in which:

The temperature responsive valve of the instant invention is generally useful in controlling the flow of cooling fluid in an internal combustion engine or other passageway, and includes generally a valve body 10 adapted to be stationarily mounted within a passageway or conduit, a movable valve member 11 coacting with the valve body, a bodily movable temperature responsive force transmitting device or thermal actuator 12, and a supporting bracket 13 extending from the discharge or outlet side of the valve.

Figure 1:
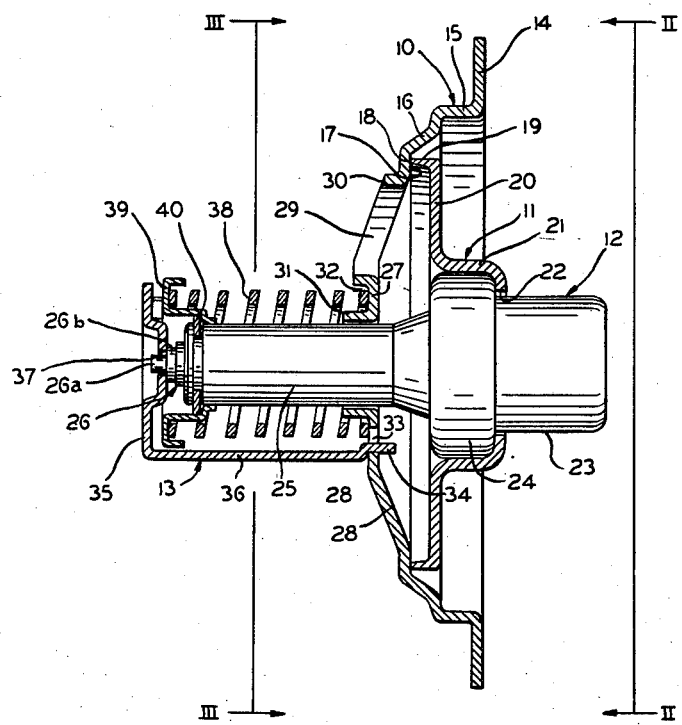
Figure 1 is an axial sectional view of the valve of the present invention, with some parts shown in elevation.
Figures 4, 5:
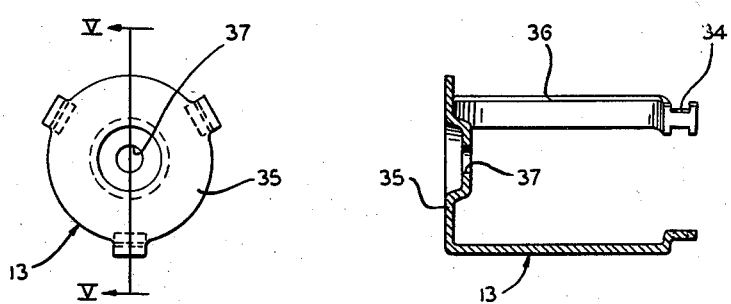
Figure 4 is an end elevational view of the bracket employed in the assembly of the valve in the instant invention.
Figure 5 is an axial section view of the bracket in Figure 4, with some parts in elevation, taken substantially along line V—V in Figure 4.
Figure 2:
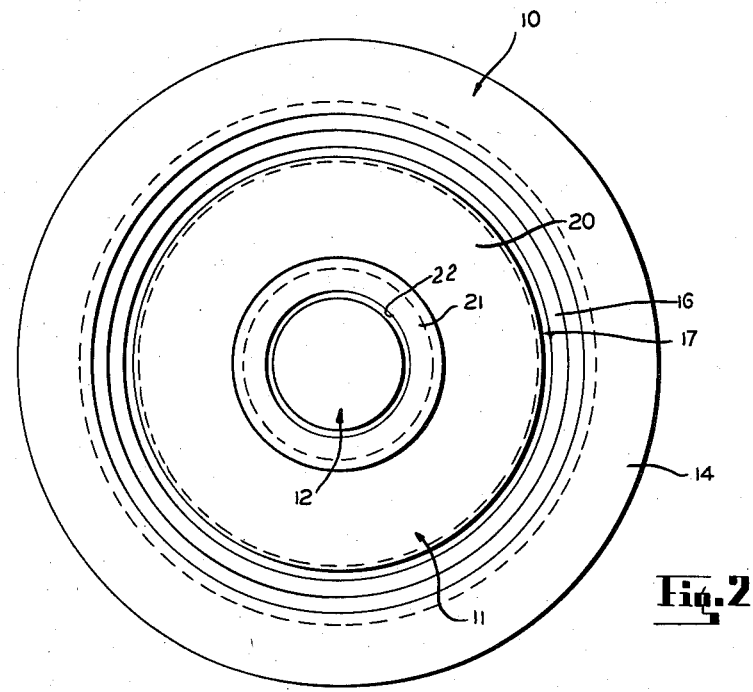
Figure 2 is an elevational view of the inlet side of the valve in Figure 1, taken along line II—II and looking in the direction of the arrows.

As seen most clearly in Figure 1, the valve body 10 includes an outer annular anchoring or supporting flange 14 that is adapted to be clamped between opposed annular faces of conduit end flanges or the like for stationarily mounting the valve within a passageway or conduit. Connected at the inner peripheral end of the flange 14 is a short cylindrical portion 15 which serves to center the valve in a passageway or conduit, and which also forms support for an inwardly converging annular section 16. Carried at the inner end of the section 16 and and integral therewith, is a radially extending annular portion defining a valve seat 17 on the inlet side of the valve. Thus, it is seen that from the anchoring flange 14 to the valve seat 17, the valve body 10 is integral and closed.

Coacting with the valve seat 17 is an annular valve face 18 defined at one end of a substantially cylindrically formed portion 19 of the valve member 11. The portion 19 is carried at the outer periphery of an annular wall 20 that is connected at its inner periphery to a dome shaped portion 21. The dome shaped portion 21 is centrally apertured at 22 to freely fit over the closed end of the thermal actuator 12.

The thermal actuator 12 is commonly called a thermal power element and may by way of example be of the same general type as shown and described in the Vernet Patent No. 2,368,181, issued on January 30, 1945. The particular utility of this type of power element is the relatively high power developed and the compactness of the assembly.

Looking at Figure 1, the thermal power element 12 includes a stepped cylindrical casing having a short cylindrical section at one end indicated by the numeral 23 that is received within the aperture 22 in the valve member 11. Adjacent the section 23 is a diametrically enlarged but narrower anchoring section 24 received in press-fitted relation within the dome shaped portion 21 of the valve member 11. Extending from the anchoring section 24 is a diametrically reduced longer barrel or shank section 25 which houses a piston 26 of the thermal power element and serves as a guide member for the bodily movable element. The piston 26 acts as a reaction member and remains relatively stationary while the shank section 25 or casing moves to open and close the valve member 11.

Figure 3:
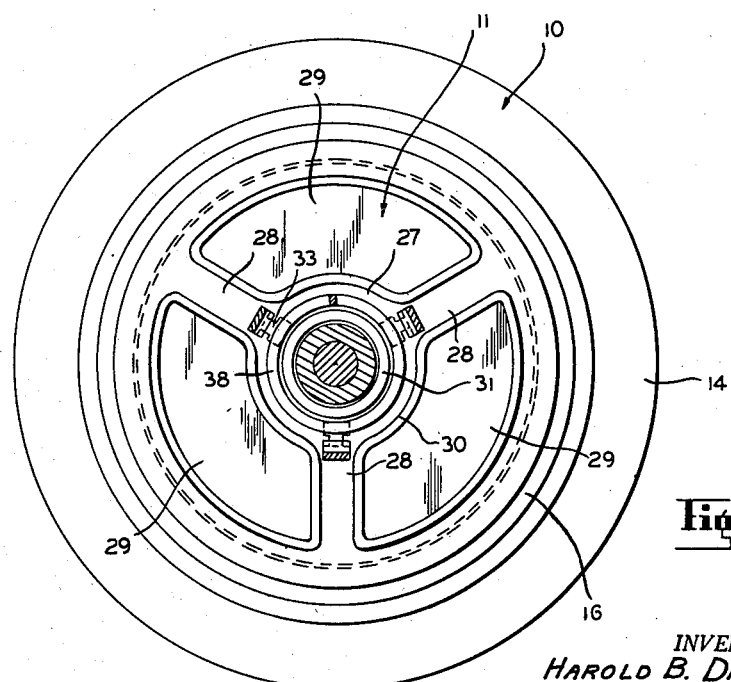
Figure 3 is an elevational view of the discharge side of the valve taken along line III—III of Figure 1 and looking in the direction of the arrows, and showing some parts in section.

At the center of the valve body 10, an annular guide member 27 is supported from the inner periphery of the valve seat portion 17 by a plurality of arms or spiders 28, thereby making the annular guide member 27 an integral part of the valve body 10. The spiders or arms 28 define with the guide member 27 and the inner periphery of the valve seat section 17 a plurality of fluid passageways or openings 29 in annular arrangement which are adapted to be closed or covered by the valve member 11. The annular guide member 27 of the valve body 10 functions as a loose guide for the thermal element 12 in receiving the elongated shank section 25. As noted particularly in Figures 1 and 3, clearance is provided between the inner periphery of a guide member 27 and the outer surface of the thermal power element shank portion 25. Thus, the valve body 10 serves as a loose guide for the thermal element 12, thereby eliminating the necessity of a separate guide bracket. The edge of the openings 29 are bent upwardly to define strengthening flange, bead or rim portions 30, while the inner periphery of the guide member 27 also carries a strengthening flange 31. The bead or rim 31 of the guide member 27 coacts with the inner portions of the beads or rims 30 surrounding the fluid openings 29 to more or less form an annular channel 32 around the guide member 27 and opening towards the discharge side of the valve.

A plurality of T-shaped slots 33, in this instance three, are circumferentially spaced in the channel formation 32 of the guide member 27 and in radial alignment with the arms 28 for receiving T-shaped ends 34 of the supporting bracket 13. The T-shaped ends of the bracket are integrally connected to a hat-shaped end wall 35 of the bracket by leg members 36. The end wall 35 is centrally apertured at 37 to freely receive the diametrically reduced end 26a of the thermal power element piston 26. Adjacent the very end portion 26a is a diametrically enlarged portion 26b which defines an annular abutting face that shoulders against the bracket end wall 35.

For resiliently biasing the valve member 11 into coacting closed position with the valve body 10 wherein the valve face 18 engages the valve seat 17, a coil spring 38 is provided which surrounds the shank section 25 of a thermal power element 12 and seats at one end in the channel 32 of the valve body guide member 27 and at the other end in a channel formation of a retaining member 39 removably secured to the shank section 25 of the thermal power element by a split locking ring and groove arrangement 40.

Except for press-fitting the valve member 11 to the thermal power element 12, the valve of the instant invention can be largely assembled by hand without any special tools. The bracket 13 merely snaps into the slots 33 of the valve body 10, and a spring 38, as shown more clearly in Figure 3, overlies the larger end of the T-slots 33 thereby retaining the bracket T-ends 34 locked in these slots.

Since the bracket 13 is attached to the valve body member within the area covered by the valve member 11, leakage through the entire valve by virtue of the placement of the attachment slots is eliminated. In other words, the slots 33 are on the discharge side of the valve and there are no perforations in the valve body 10 exterior of the periphery of the valve member 11.

Clearance between the thermal power element shank section 25 and the valve body guide member 27, and the loose fit between the thermal power element piston end 26a and the aperture 37 in the bracket end wall 35 permits slight tilting of the thermal power element 12 and the associated valve member 11. Since the valve can tilt, less leakage occurs in case of dirt entrapment between the valve seat 17 and the valve face 18, since the valve would not be open around its entire periphery. Moreover, due to dynamic conditions inherent in a fluid flow conduit mounting the valve of the instant invention, there will be slight variations in pressure across the face of the valve causing it to tilt when first opening, rather than opening all at once around its entire periphery. This opening action is less abrupt, reduces fluttering of the valve, and offers better metering to give better temperature control.

In operation, the thermal power element protracts in response to a predetermined temperature and causes the casing and attached valve member 11 to move away from the stationary piston 26 and force the valve member 11 against the force of the spring 38 to unseat the valve face 18 from the valve seat 17 and allow fluid flow around the valve member 11 and through the opening 29. Upon cooling of the fluid flow, the thermal power element will contract and allow the force of the spring 38 to close the valve.

From the foregoing, it is seen that the present invention provides a temperature responsive flow control valve of simple construction and manufacture, and capable of providing extremely efficient fluid flow control.

It will be understood that modifications and variations may be effected without departing from the scope of the novel concepts of the present invention, but it is understood that this application is to be limited only by the scope of the appended claims.

We claim as our invention:

1. In a thermostatic valve, a generally disk-shaped valve body having a flow opening therethrough and a valve seat extending about said opening, an apertured guide member supported from said body centrally of said opening on the downstream side of said seat, a support member on the downstream side of said body having a portion spaced downstream from said guide member centrally of the aperture therein, a thermal-sensitive element including a cylindrical casing extending through the opening in said valve body and the aperture in said guide member, and a piston extensible from said cylindrical casing at a predetermined temperature range and adapted to abut said portion of said support member, and a valve member mounted on said cylindrical casing on the upstream side of said seat for cooperation therewith in the control of flow through said opening, said cylindrical casing being reciprocably guided on the downstream side of said seat by said guide member and being restrained on the upstream side of said seat only by engagement of said valve member with said seat.

2. In a thermostatic valve, a generally disk-shaped valve body having a centrally located flow opening therethrough and a valve seat extending about said opening, an apertured guide member supported from said body centrally of said opening on the downstream side of said seat, a support member on the downstream side of said valve body having a portion spaced downstream from said guide member centrally of the aperture thereof, a thermal-sensitive element including a cylindrical casing extending through the opening in said body and the aperture in said guide member and a piston extensible from said cylindrical casing at a predetermined temperature range and having abutting engagement with said portion of said support member, a valve member mounted on said cylindrical casing on the upstream side of said seat and having an annular valve face for cooperation therewith in the control of flow through said opening, said cylindrical casing being reciprocably guided on the downstream side of said seat by said guide member and having a retainer on the downstream end thereof, and a spring surrounding said casing and seated between said guide member and retainer and biasing said valve into engagement with said seat and thereby retaining said valve and thermal-sensitive element to said valve body for movement along said guide member only by the force of said spring.

3. In a thermostatic valve particularly adapted to control the temperature of the coolant for an internal combustion engine, a valve body having a central guide, a seat extending about said guide and spaced upstream thereof, a plurality of arms connecting said seat with said guide, the spaces between said arms forming flow passageways, a thermal-sensitive element having a cylinder extending through said guide and loosely guided thereon and having a casing on the upstream side of said guide, a retainer on the downstream end of said cylinder and a spring interposed between said guide and retainer, a valve carried by said casing and biased into engagement with said seat by said spring, said thermal-sensitive element also having a power member extensible from said cylinder upon increases in temperature at the temperature range of operation of said thermal element, a bracket having an abutment spaced downstream from said guide and abuttingly engaged by said power member and having legs extending therefrom toward said guide and equal in number to said arms of said valve body, and an interengaging connection between said legs and said arms, securing said bracket to said valve body for ready assembly from one side thereof and maintained in engagement with said arms by the force of said spring reacting against said retainer and thermal-sensitive element.

4. In a thermostatic valve particularly adapted to control the temperature of the coolant for an internal combustion engine, a valve body having a central guide, a seat spaced upstream of said guide and extending thereabout, a plurality of arms connecting said seat with said guide, the space between said arms forming flow passageways, a thermal-sensitive element having a cylinder having a power member extensible therefrom and having a casing containing a fusible thermally expansible material, a relatively loose guiding connection between said cylinder and guide accommodating tilting movement of said cylinder with respect to said guide and spacing said casing on the upstream side of said guide, a valve carried by said casing and having an annular valve face engageable with said seat, a retainer on said cylinder downstream of said guide, a spring seated between said guide and said retainer and biasing said valve into engagement with said seat, a reaction member for said power member comprising an abutment plate extending over the end of said thermal-sensitive element and abuttingly engaged by said power member and having legs extending from said abutment plate toward said guide and having slots on the ends thereof adjacent said guide, and slots in said arms adapted to be engaged by the slots in said legs for retaining said abutment plate to said valve body and accommodating ready assembly of the valve from one side thereof.

5. In a thermostatic valve, a valve body having a flow opening therethrough and a valve seat extending about said opening and facing in an upstream direction, abutment means supported by said body centrally of said opening, a thermal-sensitive element including a cylindrical casing and a piston extensible from said casing at a predetermined temperature range and adapted to abut said abutment means, a valve member mounted on said casing and having a sealing portion upstream of said valve seat for cooperation therewith in the control of flow through said opening, and guide means supported by said body for reciprocally guiding said casing and valve member, said guide means being in addition to the inherent guiding means for said casing and valve member formed by said piston and being located in a downstream direction from the mounting of said valve member on said casing.

6. A thermostatic valve particularly adapted for cooling systems for internal combustion engines comprising a valve body adapted to be stationarily mounted, said body having a plurality of fluid openings therethrough, a valve seat on the upstream side of said valve body and spaced outwardly of said openings, a guide disposed inwardly of said openings on the downstream side of said seat, a supporting member extending from one side of said body, a temperature responsive power transmitting device including a casing and a relatively stationary reaction member, said reaction member being carried by said supporting member and said casing being intermediately and loosely guidably supported on said valve body guide, and a valve member on the upstream side of said valve body carried by said casing and bodily movable therewith for controlling fluid flow through said openings, said casing being restrained on the upstream side of said seat only by engagement of said valve member with said seat.

7. A thermostatic valve particularly adapted to control the temperature of the cooling system for an internal combustion engine comprising a valve body adapted to be stationarily mounted in a fluid conduit, said valve body having a plurality of annularly arranged fluid openings and a centrally apertured guide member at the center of said openings, an annular valve seat spaced outwardly of said openings on the upstream side of said valve body, a supporting bracket carried by said guide member and extending from the downstream side of said valve body, a thermal power element including a casing and a relatively stationary reaction member protractable from one end thereof, said reaction member being loosely associated with said supporting bracket and said casing being freely slidable in said apertured guide member and being loosely mounted therein for tilting movement with respect thereto, a valve member having an annular valve face engageable with said seat, said valve member being carried on the end of said casing opposite said reaction member and being bodily movable with said casing on the inlet side of said valve for controlling fluid flow through said openings, and spring means seated on said valve body on the downstream side thereof, acting on the downstream side of said casing to normally bias the valve face in sealing engagement with said valve body over said fluid openings.

References Cited in the file of this patent

UNITED STATES PATENTS

| | | |
|---|---|---|
| 2,132,290 | Dube | Oct. 4, 1938 |
| 2,356,958 | Von Wangenheim | Aug. 29, 1944 |
| 2,584,443 | Geisler et al. | Feb. 5, 1952 |
| 2,695,012 | Brubaker | Nov. 23, 1954 |
| 2,777,638 | Wood | Jan. 15, 1957 |